Nov. 22, 1966 M. C. PETERS 3,287,229
STEAM GENERATING PLANT
Filed July 31, 1963
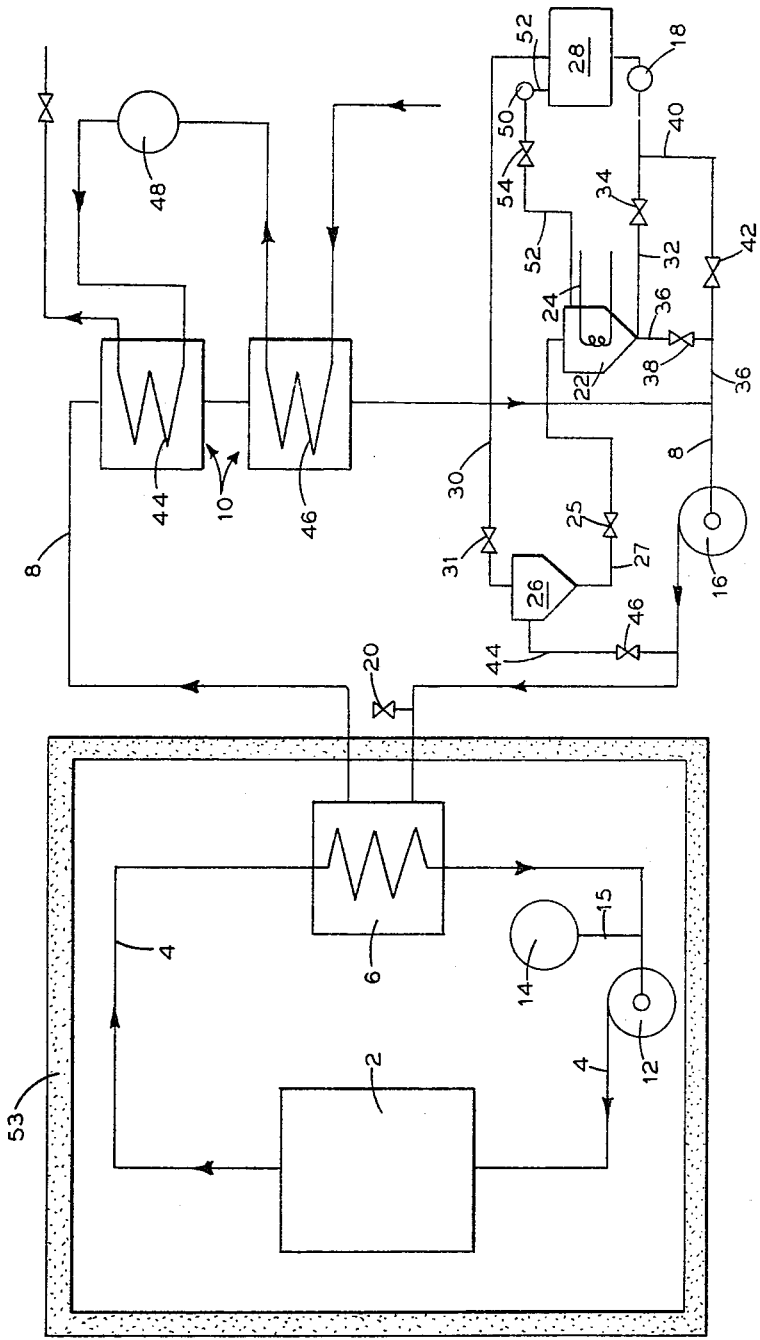
INVENTOR.
Martin C. Peters
BY
*[signature]*
ATTORNEY

United States Patent Office 3,287,229
Patented Nov. 22, 1966

3,287,229
STEAM GENERATING PLANT
Martin C. Peters, London, England, assignor to Babcock & Wilcox Limited, London, England, a corporation of Great Britain
Filed July 31, 1963, Ser. No. 298,875
Claims priority, application Great Britain, Aug. 3, 1962, 29,900/62
6 Claims. (Cl. 176—65)

This invention relates to steam generating plant of the kind including a nuclear reactor arranged to be cooled by liquid metal. When in such plant alkali metal is used as primary coolant, the consequences of tube failure in the heat exchanger for imparting heat from the primary coolant by way of secondary liquid metal coolant to water can result in pressure surges which necessitate the use even in the reactor pressure vessel of relatively thick walls. This is disadvantageous since, apart from the expense, undesirably high stresses due to thermal transients are more liable to occur the greater the thickness of the pressure vessel wall, particularly if the wall is made of material such as stainless steel of relatively low thermal conductivity.

A steam generating plant according to the present invention includes a nuclear reactor connected in a primary coolant circuit arranged to operate at superatmospheric pressure with alkali metal primary coolant flowing in series through the nuclear reactor and a first heat exchanger, a secondary coolant circuit arranged to operate with the flow through the first heat exchanger and a second heat exchanger providing steam generating surfaces of secondary coolant comprising elastic fluid at superatmospheric pressure less than that of the primary coolant and the steam pressure of the second heat exchanger and a suspension of particles of solid material adapted to convey heat from the first to the second heat exchanger, the elastic fluid and the solid material being substantially inert to fluid inadvertently leaking at the first or second heat exchanger into the secondary coolant circuit.

Advantageously, neither the elastic fluid nor the solid material of the secondary coolant is rendered highly radioactive under irradiation by gamma rays and the second heat exchanger is outside the main biological shield enclosing the nuclear reactor and the first heat exchanger.

A nuclear reactor arrangement in accordance with the invention will now be described, by way of example, with reference to the accompanying schematic drawing of a nuclear powered steam generating plant.

Referring to the drawing, a nuclear reactor 2 is connected in a primary coolant circuit 4 arranged to operate at a pressure of about 150 p.s.i.a. with an alkali primary coolant such as liquid sodium, potassium or lithium or their mixtures flowing in series through the nuclear reactor 2 and a first heat exchanger 6.

A pump 12 disposed between the first heat exchanger 6 and the nuclear reactor 2 is arranged to circulate the liquid primary coolant through the nuclear reactor 2 and the tubes of the first heat exchanger 6.

A suitable pressurizer 14 is connected by means of conduit 15 to the circuit 4 and is provided for determining the pressure, suitably, a pressure of 150 p.s.i.a. in the primary coolant circuit although a static head of liquid metal would be applicable.

A secondary coolant circuit 8 is arranged to operate with series flow through the first heat exchanger and a second heat exchanger means 10 providing steam generating surfaces of secondary coolant in the form of carbon dioxide gas at a pressure of 100 p.s.i.a. A suspension of particles of pure graphite in suitably finely divided form in this gas is adapted to convey heat from the first heat exchanger 6 to the second heat exchanger means 10.

A circulator 16 disposed between the outlet from the second heat exchanger means 10 and the inlet to the first heat exchanger 6 is arranged to circulate the secondary coolant around the secondary coolant circuit. A suitable feed pump 18 is provided for forcing the gaseous fluid of the secondary coolant into the secondary coolant circuit 8, and the feed pump is automatically controlled in dependence upon the pressure of the circuit in order to maintain a substantially constant predetermined pressure within the circuit, suitably a pressure of 100 p.s.i.a. Alternatively, a suitable pressurizer may be provided for this purpose. A suitable relief valve 20 is arranged to limit pressure rise in the secondary coolant circuit above the predetermined value of 100 p.s.i.a.

The circuit 8 is also provided for charge and discharge purposes with separating means in the form of a separator 26, suitably of the centrifugal variety, for separating the solid particles from the elastic fluid and delivering the separated particles to a store in the form of a sealed hopper 22 provided with heating elements 24.

The separator 26 is connected to the sealed hopper 22 by a duct 27 provided with valve means 25 and also to a gas storage vessel 28 by a duct 30 provided with valve means 31. The gas storage vessel 28 is connected to a large gas chamber (not shown) which acts as a gas reservoir and maintained at atmospheric pressure. A conduit 32 in which are disposed a pump 18 and valve means 34 connects the hopper 22 with the gas storage vessel 28. A discharge line 36 provided with valve means 38 connects the hopper 22 to the secondary coolant circuit 8 and a by-pass circuit 40 arranged to by-pass the hopper 22 and provided with valve means 42 connects the discharge side of the pump 18 with the circuit 8 through the duct 36. A conduit 44 in which is disposed valve means 46 connects the separator 26 with the secondary coolant circuit 8. A pump 50 is disposed in the duct 52 and is provided with valve means 54 arranged to exhaust the gases from the hopper 22 to the storage vessel 28.

The charge and discharge means is arranged to vary the concentration of solid particles in the elastic fluid with a view to altering the heat carrying capacity of the secondary coolant, and this is effected by either introducing solid particles from the hopper 22 to the secondary coolant circuit 8 by means of the pump 18 and the discharge line 36 or by withdrawing the mixture from the coolant circuit 8 to the separator 26 and separating a proportion of the solid particles from the gaseous fluid and returning the separated particles to the hopper 22 by way of the duct 27.

In operation of the charge and discharge means, when it is desired to add solid particles to the gaseous fluid in the secondary coolant circuit 8 with a view to increasing the heat carrying capacity of the coolant, this is effected by feeding the solid particles from the hopper 22, which is normally maintained at a lower pressure than the pressure in the circuit 8 by means of the pump 50 exhausting the gases from the hopper to the storage vessel 28 by way of the duct 52. To effect the feeding of solid particles the pump 50 is shut down and valve means 54 in the duct 52 is shut and the pump 18 is operated at a pressure slightly in excess of the pressure in the circuit 8, the valve means 34 in the conduit 32 is opened and pressure in the storage hopper 22 is raised to a pressure in excess of the pressure in the circuit 8. Subsequently the valve means 38 in the duct 36 is opened and a dense and concentrated mixture of solid particles is forced through the duct 36 into the coolant of the circuit 8. Conversely, when it is desired to reduce the solid particle concentration with a view to reducing the heat conveying capacity of the coolant, the pump 18 is shut down along with the valve means 34 and 38 in the respective circuits 32 and 36. Subsequently the pump 50 is started up and valve means 54 opened in order to reduce the pressure in the hopper 22 to considerably below the pressure in the secondary coolant circuit 8. The valve means 25 in the circuit 27 is then opened and the pressure in the separator 26 is correspondingly reduced. To enable the mixture to be drawn from the secondary coolant circuit 8 to the separator 26 the valve means 46 in the conduit 44 is opened and the mixture withdrawn and a proportion of the solid particles are separated therein and returned to the hopper 22 by way of duct 27. The valve means 31 in the duct 30 is also opened to allow the gaseous fluid to return from the separator to the storage vessel 28 by way of duct 30.

When it is desired to introduce gaseous fluid only into the secondary coolant circuit 8, the pump 18 is operated at a pressure slightly in excess of the pressure in the circuit 8, and with all the valve means in the charge and discharge means shut, the valve means 42 in the by-pass circuit 40 is opened and gaseous fluid is forced into the circuit 8 by way of ducts 40 and 36 from the storage vessel 28.

At the second heat exchanger means 10 the secondary coolant passes first through a superheating section 44 and then through a vaporizing and economizer section 46 of the heat exchanger. As shown, the two sections are in separate pressure vessels and the heat exchanger is a natural circulation boiler having a separating drum 48 but the sections may be in a common pressure vessel and the heat exchanger may be of any suitable type.

The primary coolant circuit 4 including the nuclear reactor 2 and the first heat exchanger 6 are enclosed within a main biological shield 53 but the remainder of the apparatus is located outside the shield 53. Thanks to their non-radioactive properties neither the carbon dioxide gas nor the graphite particles are rendered highly radioactive under irradiation by gamma rays.

Besides carbon dioxide other gases, such as nitrogen, helium or argon or a mixture of two or more of these gases may be used.

Advantageously, the wall thickness of the pressure vessel enclosing the nuclear reactor core 2 is suited to the maximum pressure prevailing in the vessel during normal operating conditions rather than the pressure due to an explosion. It will be appreciated that such a relatively thin-walled pressure vessel may safety be used in view of the avoidance of the danger of explosive pressure surges due to the interaction of alkali metal and water.

The secondary coolant circuit constitutes an effective and relatively inexpensive means for transferring heat from the primary coolant to the working fluid of the second heat exchanger and in practice, in the event of inadvertent leakage, primary coolant or water can leak into the secondary coolant circuit, because the elastic fluid is at a lower pressure than either of them, without danger of an explosion or of a serious stress corrosion which might give rise to an explosion.

What is claimed is:

1. A steam generating plant comprising a primary coolant circuit and a secondary coolant circuit, a nuclear reactor and a first heat exchanger positioned in said primary coolant circuit, a liquid alkali metal primary coolant operating at superatmospheric pressure circulating through said primary coolant circuit absorbing heat within said nuclear reactor and releasing heat within said first heat exchanger, a second heat exchanger and said first heat exchanger positioned in said secondary coolant circuit, tubular vapor generating surfaces disposed within said second heat exchanger, an elastic fluid secondary coolant containing a suspension of particles of solid material circulating through said secondary coolant circuit absorbing heat from said primary coolant within said first heat exchanger and giving up heat within said second heat exchanger as it flows over said tubular vapor generating surfaces, said secondary coolant operating at a superatmospheric pressure which is less than that of the pressure of the primary coolant, a vaporizable liquid circulating through said tubular vapor generating surfaces in said second heat exchanger to receive heat from said secondary coolant and to be vaporized in the course of its flow through said second heat exchanger, said vaporizable liquid operating at a vapor pressure in said heat exchanger which is greater than the pressure of said secondary coolant, whereby the particles of solid material in the elastic fluid secondary coolant are adapted to convey heat from said first heat exchanger to said second heat exchanger and the elastic fluid and the solid material therein are inert to fluid inadvertently leaking into the secondary coolant circuit in the first and second heat exchangers.

2. A steam generating plant according to claim 1 wherein a biological shield encloses said primary coolant circuit, said second heat exchanger located exteriorly of said biological shield, said secondary coolant circuit passing through said biological sheild communicating between said first and second heat exchangers, said secondary coolant comprising elastic fluid and solid material being relatively unaffected under radiation by gamma rays whereby the secondary coolant is not rendered highly radioactive and accordingly the vaporizable liquid circulating through said second heat exchanger is not exposed to high levels of radioactivity.

3. A steam generating plant according to claim 2 wherein the elastic fluid is selected from the group inert gases consisting of nitrogen, helium, argon and carbon dioxide.

4. A steam generating plant according to claim 3 wherein the particles of solid material in the secondary coolant is graphite.

5. A steam generating plant according to claim 4 wherein pressurizer means are provided in said primary and secondary coolant circuits for maintaining a selected pressure of the coolant therein.

6. A steam generating plant according to claim 5 wherein means are provided in connection with the secondary coolant circuit for varying the concentration of the solid material particles in the elastic fluid.

References Cited by the Examiner

UNITED STATES PATENTS 3,063,926  11/1962  Poole et al. _____ 176—92 X
3,125,158  3/1964   Schluderberg _____ 165—107 X

OTHER REFERENCES

Directory of Nuclear Reactors, vol. I (Power Reactors), published by the International Atomic Energy Agency, Austria, 1959, pp. 188, 189, 194, 195, 200, 201, 205, 206, 207.

REUBEN EPSTEIN, *Primary Examiner.*